United States Patent
Stoloff et al.

(10) Patent No.: US 9,663,075 B2
(45) Date of Patent: May 30, 2017

(54) ELECTRIC PARKING BRAKE CONTROL USING STEERING WHEEL TORQUE TO DETERMINE DRIVER PRESENCE

(71) Applicants: Paul H Stoloff, Farmington Hills, MI (US); David Myzienski, Macomb Township, MI (US); David D Dicks, Linden, MI (US)

(72) Inventors: Paul H Stoloff, Farmington Hills, MI (US); David Myzienski, Macomb Township, MI (US); David D Dicks, Linden, MI (US)

(73) Assignee: FCA US LLC, Auburn Hills, MI (US)

( * ) Notice: Subject to any disclaimer, the term of this patent is extended or adjusted under 35 U.S.C. 154(b) by 33 days.

(21) Appl. No.: 14/825,727

(22) Filed: Aug. 13, 2015

(65) Prior Publication Data

US 2017/0043752 A1    Feb. 16, 2017

(51) Int. Cl.
| | |
|---|---|
| *B60T 7/12* | (2006.01) |
| *B60T 8/171* | (2006.01) |
| *B60N 2/00* | (2006.01) |
| *B62D 15/02* | (2006.01) |

(52) U.S. Cl.
CPC ............. *B60T 7/12* (2013.01); *B60N 2/002* (2013.01); *B60T 8/171* (2013.01); *B62D 15/02* (2013.01)

(58) Field of Classification Search
CPC .......... B60R 7/12; B60R 8/171; B60N 2/002; B62D 15/02
USPC ........................................... 701/70
See application file for complete search history.

(56) References Cited

U.S. PATENT DOCUMENTS

| | | |
|---|---|---|
| 8,825,326 B2 | 9/2014 | Jeon |
| 2007/0029876 A1 | 2/2007 | Makishima et al. |
| 2016/0001781 A1* | 1/2016 | Fung ............... G06F 19/345 701/36 |

\* cited by examiner

*Primary Examiner* — Khoi Tran
*Assistant Examiner* — Robert Nguyen
(74) *Attorney, Agent, or Firm* — Ralph E. Smith

(57) ABSTRACT

An automotive vehicle has an electric parking brake (EPB) and an electronic control unit (ECU) configured to control the EPB. The ECU is configured to control the EPB to apply it upon determining that a driver is not present in the vehicle. The ECU is configured to determine whether the driver is present in the vehicle or not based at least upon there having been or not having been a steering input. The ECU is configured to determine that there has been a steering input when a steering torque signal from an electric power steering system of the vehicle has changed by at least a threshold amount during a set period of time based and determine that there has not been a steering input when the steering torque signal has not changed by at least the threshold amount during the set period of time.

4 Claims, 5 Drawing Sheets

ELECTRIC PARKING BRAKE CONTROL USING STEERING WHEEL TORQUE TO DETERMINE DRIVER PRESENCE

FIELD

The present invention relates to control of an electric parking brake of a vehicle using steering wheel torque to determine driver presence.

BACKGROUND

In many automotive vehicles having electric parking brakes, the electric parking brake is applied if it is detected that the driver is not present and the vehicle is in gear. One such example is a control known as "SafeHold" that a number of vehicles available from FCA US LLC have. This SafeHold control uses a number of inputs to determine whether to apply the electric parking brake due to lack of driver presence when the vehicle is in a state that might allow the vehicle to move. More specifically, SafeHold control uses vehicle speed, transmission position, accelerator pedal position, brake pedal position, seat belt condition, and driver door position to determine whether to apply the electric parking brake due to lack of driver presence in the vehicle.

With reference to FIGS. 1 and 2, a basic method by which the SafeHold control determines to apply the electric parking brake due to lack of driver presence is described. FIG. 1 is a simplified schematic representation of an automotive vehicle 100 having an electric parking brake and an electronic control unit. The electronic control unit will be referred to herein as ECU 102 and the electric parking brake will be referred to herein as EPB 104. ECU 102 is configured to control EPB 104 including being configured to implement the SafeHold feature. It should be understood that ECU 102 may be an ECU that controls other aspects of the vehicle as well as EPB 104. In an example, ECU 102 is the electronic control unit for an electronic stability system of vehicle 100.

The schematic of FIG. 1 shows the inputs to ECU 102 used by the SafeHold control in whether to apply EPB 104 due to lack of driver presence in vehicle 100. These inputs include a driver door open/closed input which will be referred to herein as driver door ajar input 106, a driver seat belt buckled/unbuckled input 108, a brake pedal position input 110, a throttle pedal position input 112, an ignition switch position input 114, a transmission PRNDL position input 116 and a vehicle speed input 118. Driver door ajar input 106 receives a signal that indicative of indicates whether a driver door 107 of vehicle 100 is ajar. Driver seat belt buckled/unbuckled input 108 receives a signal indicative of whether a driver seat belt 109 of vehicle 100 is buckled or unbuckled. Brake pedal position input 110 receives a signal indicative of whether a brake pedal 111 of vehicle 100 is at rest, for example a signal indicative of brake pressure wherein brake pressure being above a predetermined threshold is indicative that the brake pedal has been pushed and being below the predetermined threshold is indicative of the brake pedal being at rest. Throttle pedal position input 112 receives a signal indicative of whether a throttle pedal 113 of vehicle 100 is at rest. Ignition switch position input 114 receives a signal indicative of whether an ignition switch 115 of vehicle 100 is in a run position. Transmission PRNDL position input 116 receives a signal (or signals) indicative of whether a transmission 117 of vehicle 100 is in any of reverse, neutral or drive. Vehicle speed input 118 receives a signal indicative of a speed of vehicle 100. In this regard, that It should be understood that each of these inputs are provided by known devices in vehicle 100, which can be different types of sensors, switches or other devices as is known to those skill in the art. It should also be understood that these devices may be directly coupled to ECU 102, coupled to ECU 102 over a bus such as a CAN bus, coupled to other electronic control devices in the vehicle such as a body controller electronic control unit or an engine controller electronic control unit which then communicates their status to ECU 102, or any combination of the foregoing. It should be understood that the control of EPB 104 that ECU 102 is configured to implement may utilize other inputs for the control of EPB 104 for aspects of the control of EPB 104 other than the SafeHold control.

FIG. 2 is a flow chart of a software control program that is programmed in ECU 102 that configures ECU 102 to implement the SafeHold control. It should be understood that when it is stated that the control program performs a function, it means that ECU 102 is configured by the control program to perform the function. The control program starts at 200. At 202, the control program checks whether the driver door of vehicle 100 is open. If the driver door is open, the control program proceeds to 204 and if not, the control program branches back to 200. At 204 the control program checks whether the driver seatbelt is unbuckled. If the driver seat belt is unbuckled, the control program proceeds to 206 and if not, the control program branches back to 200. At 206, the control program checks whether the brake pedal of vehicle 100 is at rest (that is, whether the brake pedal is not depressed). If the brake pedal is at rest, the control program proceeds to 208 and if not, the control program branches back to 200. At 208 the control program checks whether the throttle pedal is at rest (that is, whether the throttle pedal is not depressed). If the throttle pedal is at rest, the control program proceeds to 210 and if not, the control program branches back to 200. At 210, the control program checks whether the ignition switch of vehicle 100 is in the run position. If the ignition switch is in the run position, the control program proceeds to 212 and if not, the control program branches back to 200. At 212, the control program checks whether the transmission of vehicle 100 is in a position that would allow vehicle 100 to move such as in reverse, neutral, drive or low such as by checking whether the PRNDL position is in reverse, neutral, drive or low. If the transmission is in a position that would allow vehicle 100 to move, the control program proceeds to 214 and if not, the control program branches back to 200. At 214, the control program checks whether vehicle 100 is traveling at a speed less than 5 KPH. If vehicle 100 is traveling at a speed less than 5 KPH, the control program proceeds to 218, and if not, the control program branches back to 200. At 218, the control program applies the SafeHold control and applies EPB 104 which applies the parking brake function provided by EPB 104 to brake vehicle 100. The control program then proceeds to end at 220.

To summarize, the control program applies EPB 104 due to lack of driver presence when it determines that the driver door is ajar, the driver seatbelt is unbuckled, the brake pedal is at rest, the throttle pedal is at rest, the ignition switch is in the run position, the transmission is in a position that would allow vehicle 100 to move (such as run, neutral, drive or low), and vehicle 100 is traveling at a speed less than 5 KPH. In some cases, the foregoing has resulted in a false positive where the control program has determined lack of driver presence and activated EPB 104 when the driver is still present in the vehicle.

SUMMARY

In accordance with an aspect of the present disclosure, an automotive vehicle has an electric parking brake and an electronic control unit configured to control the electric parking brake. The electronic control unit is configured to control the electric parking brake to apply it upon determining that a driver is not present in the vehicle. The electronic control unit is configured to determine that the driver is present in the vehicle based at least upon there having been a steering input wherein the steering input is whether a steering wheel of the vehicle has been turned by a driver and determining that the driver is not present based at least upon there not having been a steering input. The electronic control unit is configured to determine that there has been a steering input when a steering torque signal from an electric power steering system of the vehicle has changed by at least a threshold amount during a set period of time based and determine that there has not been a steering input when the steering torque signal from the electric power steering of the vehicle has not changed by at least the threshold amount during the set period of time.

In an aspect, the electronic control unit is configured to determine that the driver is not present also based upon all of a driver door ajar input indicating that the driver door of the vehicle is open, a driver seatbelt buckled/unbuckled input indicating that a driver seatbelt of the vehicle is unbuckled, a brake pedal position input indicating that a brake pedal of the vehicle is at rest, a throttle pedal position indicating that a throttle pedal of the vehicle is at rest, an ignition switch input of the vehicle indicating that an ignition switch of the vehicle is in a run position, a transmission PRNDL position input indicating that a transmission of the vehicle is in any of reverse, neutral or drive, and a speed input indicating that a speed of the vehicle is less than five kilometers per hour.

BRIEF DESCRIPTION OF THE DRAWINGS

The present invention will become more fully understood from the detailed description and the accompanying drawings, wherein.

DETAILED DESCRIPTION

Figure 1:
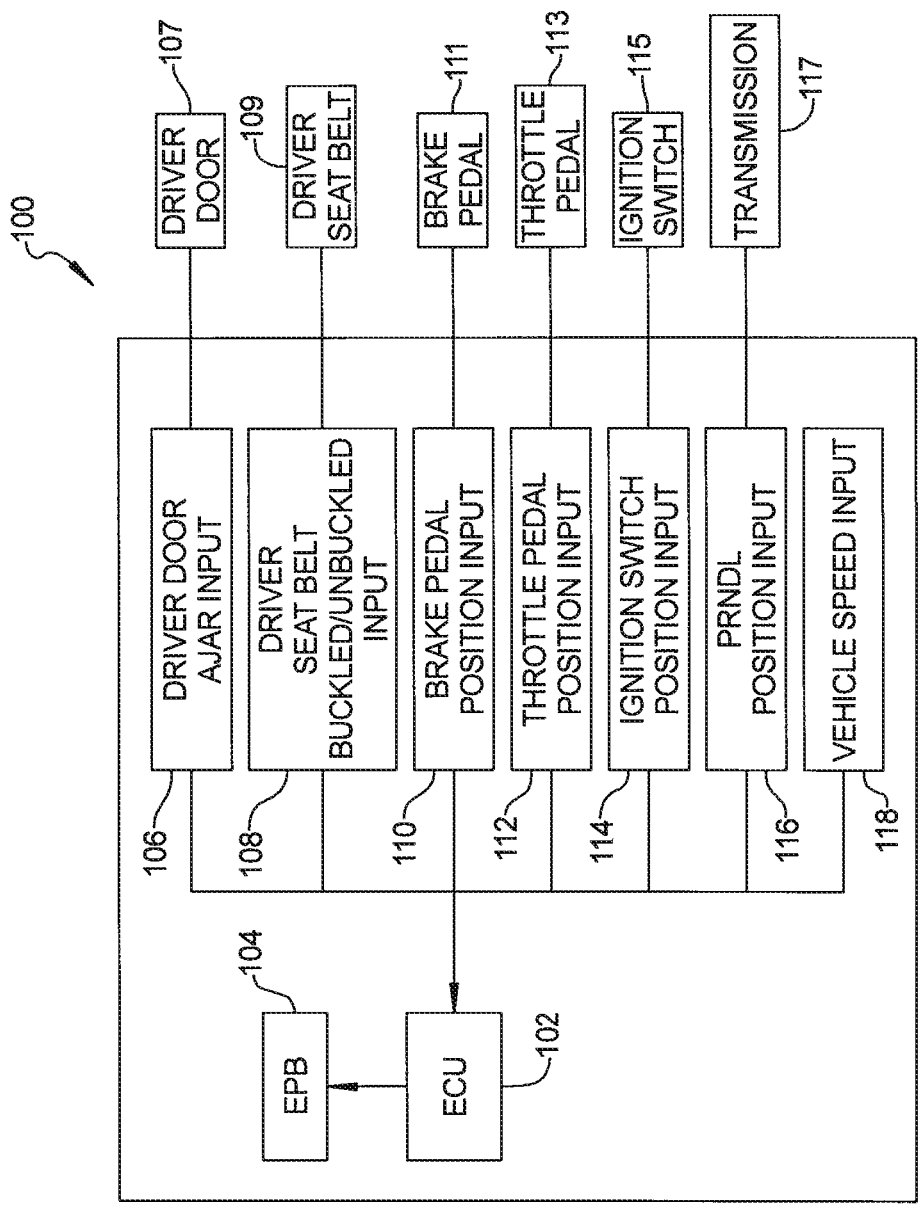
FIG. 1 is a simplified schematic representation of a prior art example of a vehicle having an electric parking brake and electronic control unit that controls the electric parking brake.

The following description of the preferred embodiment(s) is merely exemplary in nature and is in no way intended to limit the invention, its application, or uses. Corresponding reference numerals indicate corresponding parts throughout the several views of the drawings.

In accordance with an aspect of the present disclosure, a steering input indicative that the driver has turned the steering wheel in the vehicle is used as an input in the determination of whether a driver is present in vehicle 100 in determining whether to apply EPB 104 due to lack of driver presence. This steering input is determined based on changes (or lack of changes) in steering wheel torque over a set period of time as described below.

Figure 2:
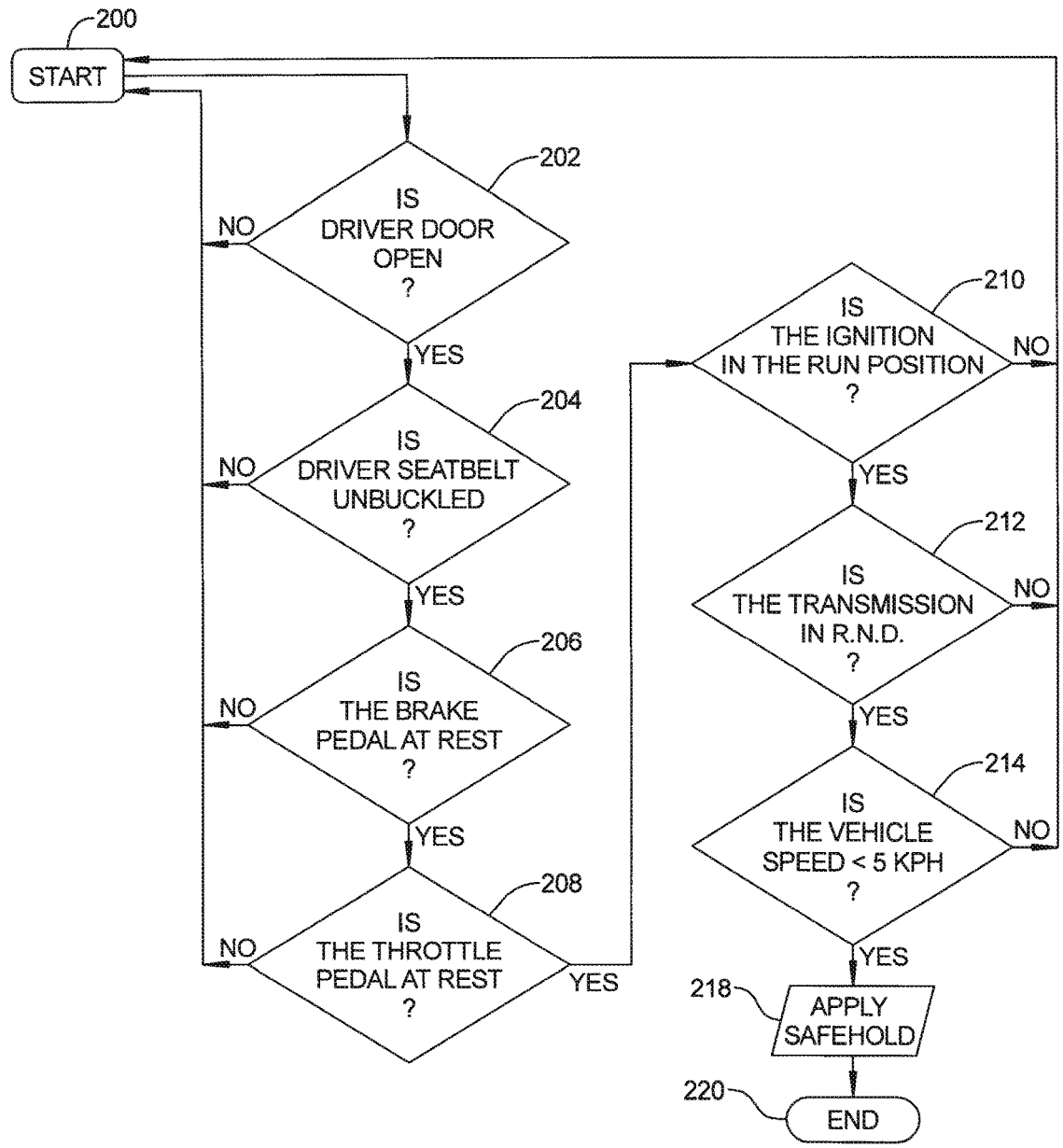
FIG. 2 is a flow chart of a software control program for the control of the electric parking brake of FIG. 1 that is programmed in the electronic control unit of FIG. 1.
Figure 3:
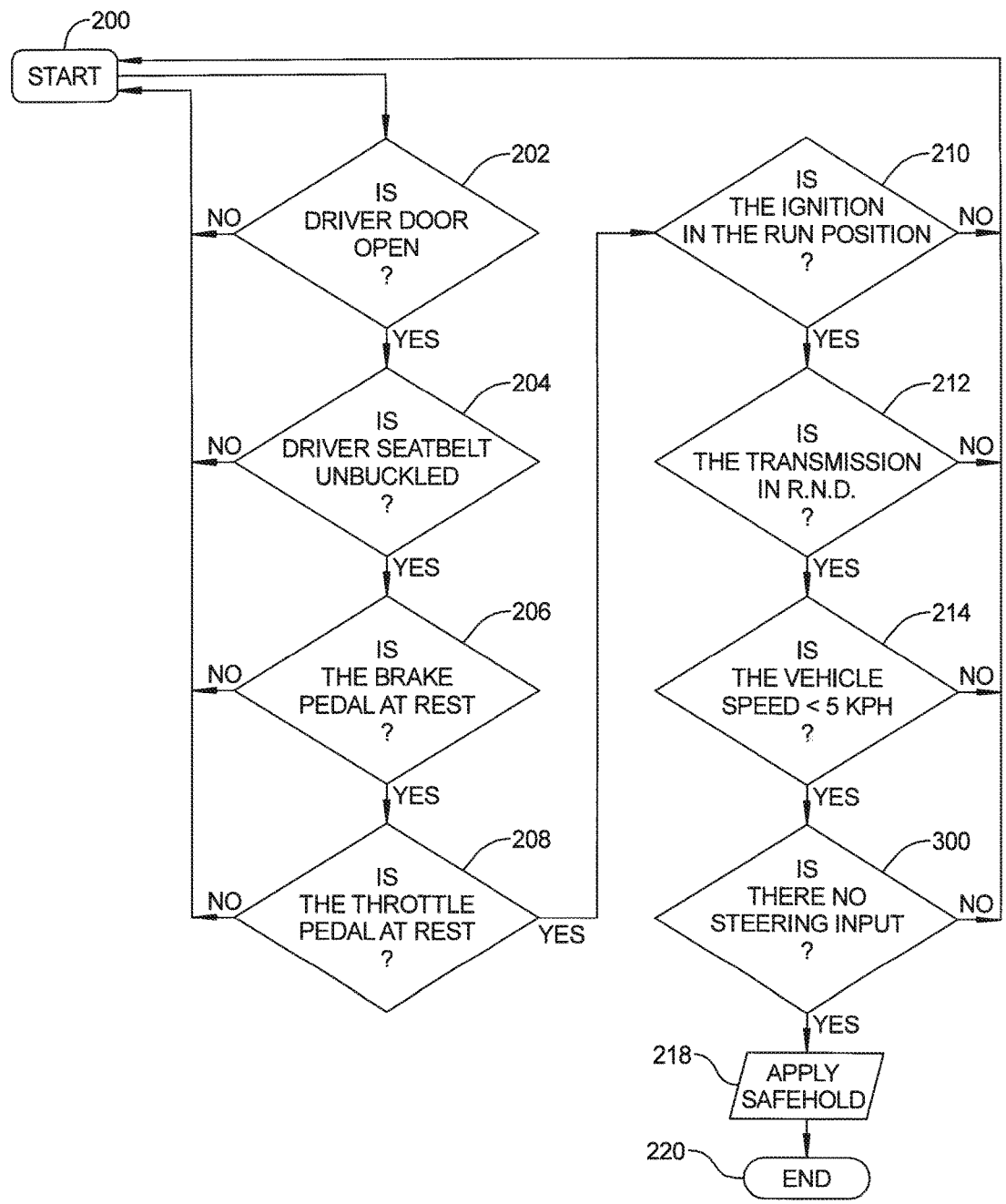
FIG. 3 is a flow chart of a software control program in accordance with an aspect of the present disclosure for the control of an electric parking brake such as the electric parking brake of FIG. 2 in which steering wheel torque is used as an input.

FIG. 3 is a flow chart of an exemplar software control program that is programmed in ECU 102 that configures ECU 102 to implement the control of EPB 104 in which a steering input is used as such an input. The examplar control program shown in FIG. 3 is with the addition of steering input as an input otherwise the same as the control program shown in FIG. 2. The discussion will thus focus on the differences.

In the control program shown in FIG. 3, the additional input of steering input is used at 300 in the determination of whether to apply EPB 104. More specifically, upon determining at 214 that the speed of vehicle 100 is less than 5 KPH, the control program proceeds to 300 whether it determines if there is a no steering input. If there is no steering input, the control program proceeds to 218 where it applies the EPB 300 and if there is a steering input, the control program branches back 200. The control program checks whether steering input flag $F_{ST}$ (described below) is set to determine whether there is a steering input. As discussed below, steering input flag $F_{ST}$ is set if there was a steering input—the steering wheel of the vehicle being turned—and cleared if there was not a steering input.

Figure 4:
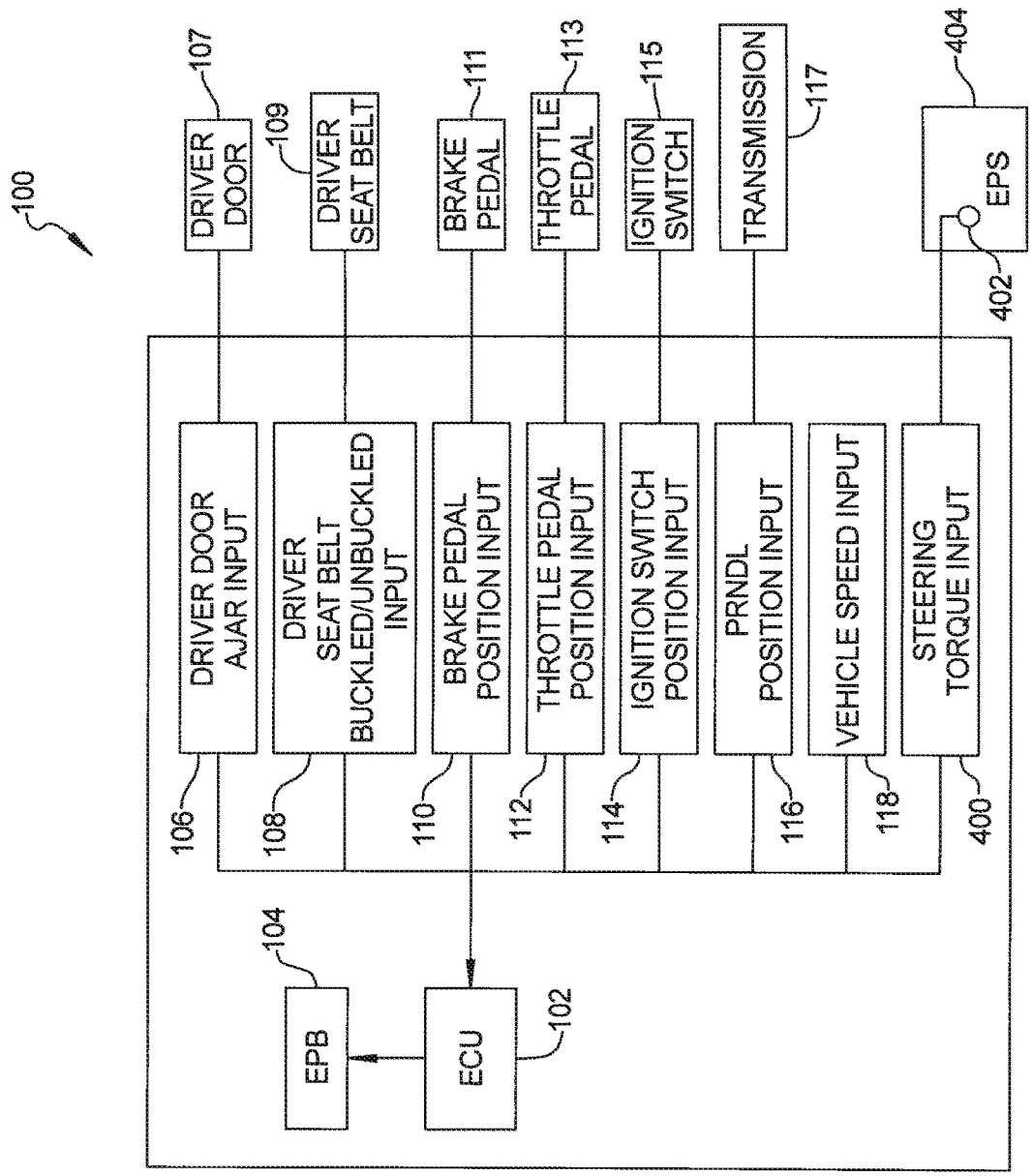
FIG. 4 is a simplified schematic representation of a vehicle having an electric parking brake and electronic control unit that controls the electric parking brake having the software control program of FIG. 3.

In an aspect, steering wheel torque is used to determine whether there has been a steering input. In this regard, the presence of a steering input indicates that the driver is present in vehicle 100. More specifically, a torque signal from a torque sensor 402 of an electric power steering system 404 of vehicle 100' (FIG. 4) is provided as steering torque input 400 to ECU 102' that is used to determine whether there was a steering input that is then used along with the other inputs in accordance with the control program of FIG. 3 to determine whether to apply EPB 104 due to lack of driver presence. It should be understood that this steering torque signal is indicative of steering wheel torque. As used herein and as is known in the art, an electric power steering system of a vehicle is a power steering system that has an electric motor that moves, or assists in moving, the steering linkage of the vehicle to turn the front wheels of the vehicle in response to a driver turning the steering wheel. In an aspect, the electric power steering system has a torque sensor that senses torque in the electric power steering system due to the driver turning the steering wheel and the output of this torque sensor is used to provide the steering torque input 400 to ECU 102'. Electric power steering systems known in the art have such a torque sensor that provides the main input for determining the amount of steering assistance needed.

Figure 5:
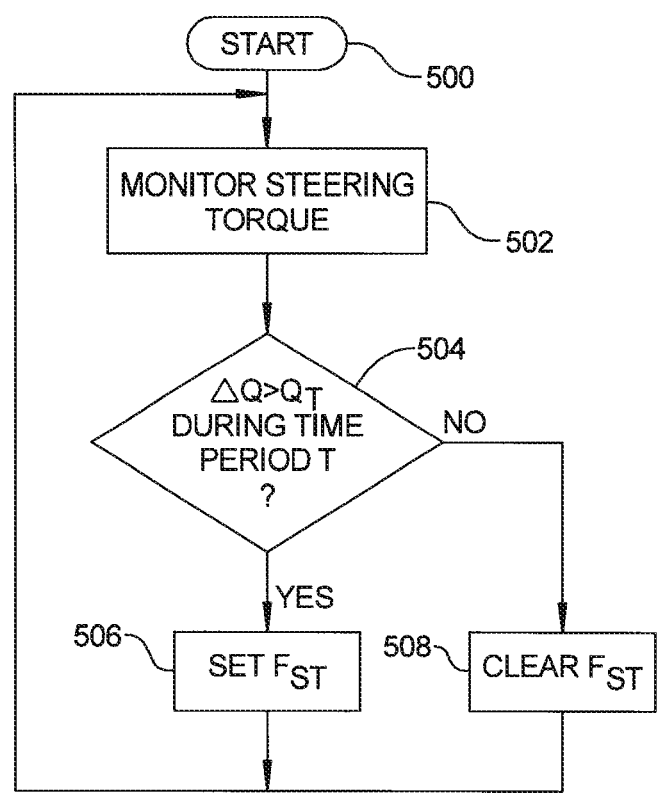
FIG. 5 is basic block diagram of a flow chart showing in more detail logic of the steering input decision block of FIG. 3.

FIG. 5 is a flow chart of logic for a program for setting and clearing the steering input flag $F_{ST}$ that is checked at decision block 300 in FIG. 3 to determine if there was no steering input, referred to herein as steering input program. The steering input program starts at 500 and at 502, monitors the steering torque input 400 from the electric power steering system 404 of vehicle 100. At 504, the steering input control program checks whether there has been a change in steering torque during a set period of time, this change referred to herein as $\Delta Q$, that is greater than a threshold $Q_T$. If so, then the steering input control program determines that there was a steering input and at 506 the steering input program sets steering input flag $F_{ST}$ and then returns to 502. If there was not a change in steering torque during the set period of time that was greater than $Q_T$, then the steering input program proceeds to 508 where it clears the steering input flag $F_{ST}$ and then branches back to 502. In an aspect, the set period of time T and the torque threshold $Q_T$ are calibratable values. In an aspect, they are determined heuristically and programmed in ECU 102' such as during the manufacture of the vehicle. In an example, the set period of time T is 1.5 seconds and the torque threshold $Q_T$ is 1 Nm. It should be understood that these are examples and the set period of time T can be other than 1.5 seconds and the torque threshold $Q_T$ can be other than 1 Nm. In an aspect, the steering input control program loops every 100-200 ms.

In accordance with the foregoing, the steering input control program sets the steering input flag $F_{ST}$ if there is a sufficient change in steering torque during the set time period T. Once steering input flag $F_{ST}$ is set, it remains set until the set time period T has elapsed without there being the sufficient change in steering torque at which point the steering input flag $F_{ST}$ is cleared. In this regard, the full set time period T must have elapsed without a sufficient change in steering torque occurring before the steering input flag $F_{ST}$ is cleared. The steering input flag $F_{ST}$ is cleared once the set time period T has elapsed without the sufficient change in steering torque occurring so as not to inhibit SafeHold for an extended period of time.

While the foregoing has been described in the context of the SafeHold control of electric parking brakes, it should be understood that it is applicable control of electric parking brakes other than the SafeHold control.

ECU 102' in which the above described control is implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that ECU 102' performs a function or is configured to perform a function, it should be understood that ECU 102' is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an electric parking brake of an automotive vehicle with an electronic control unit of the vehicle configured to control the electric parking brake, comprising:
   determining with the electronic control unit that there has not been a steering input when a steering torque signal from an electric power steering system of the vehicle has not changed by at least a threshold amount during a set period of time;
   determining with the electronic control unit that there has been the steering input when a steering torque signal from the electric power steering system of the vehicle has changed by at least a threshold amount during the set period of time; and
   controlling the electric parking brake with the electronic control unit to apply the electric parking brake based upon the determination there has not been the steering input.

2. The method of claim 1, wherein controlling the electric parking brake with the electronic control unit to apply the parking brake is further based upon all of:
   a driver door ajar input indicating that the driver door of the vehicle is open;
   a driver seatbelt buckled/unbuckled input indicating that a driver seatbelt of the vehicle is unbuckled;
   a brake pedal position input indicating that a brake pedal of the vehicle is at rest;
   a throttle pedal position indicating that a throttle pedal of the vehicle is at rest;
   an ignition switch input of the vehicle indicating that an ignition switch of the vehicle is in a run position;
   a transmission PRNDL position input indicating that a transmission of the vehicle is in any of reverse, neutral or drive; and
   a speed input indicating that a speed of the vehicle is less than five kilometers per hour.

3. An automotive vehicle, comprising:
   an electric parking brake;
   an electronic control unit configured to control the electric parking brake;
   the electronic control unit configured to determine that there has not been a steering input when a steering torque signal from an electric power steering system of the vehicle has not changed by at least a threshold amount during a set period of time;
   the electronic control unit further configured to determine that there has been a steering input when a steering torque signal from the electric power steering system of the vehicle has changed by at least a threshold amount during the set period of time; and
   the electronic control unit further configured to control the electric parking brake to apply the electric parking brake based upon the determination there has not been the steering input.

4. The automotive vehicle of claim 3, wherein the electronic control unit is further configured to control the electric parking brake to apply the parking brake based upon all of:
   a driver door ajar input indicating that the driver door of the vehicle is open;
   a driver seatbelt buckled/unbuckled input indicating that a driver seatbelt of the vehicle is unbuckled;
   a brake pedal position input indicating that a brake pedal of the vehicle is at rest;
   a throttle pedal position indicating that a throttle pedal of the vehicle is at rest;
   an ignition switch input of the vehicle indicating that an ignition switch of the vehicle is in a run position;
   a transmission PRNDL position input indicating that a transmission of the vehicle is in any of reverse, neutral or drive; and
   a speed input indicating that a speed of the vehicle is less than five kilometers per hour.

* * * * *